US010217161B2

(12) United States Patent
Friedman

(10) Patent No.: US 10,217,161 B2
(45) **Date of Patent: *Feb. 26, 2019**

(54) DYNAMICALLY DETERMINING BID INCREMENTS FOR ONLINE AUCTIONS

(71) Applicant: Ten-X, LLC., Irvine, CA (US)

(72) Inventor: Robert Friedman, Irvine, CA (US)

(73) Assignee: Ten-X, LLC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,534

(22) Filed: Mar. 9, 2018

(65) Prior Publication Data

US 2018/0197236 A1 Jul. 12, 2018

Related U.S. Application Data

(63) Continuation of application No. 13/717,656, filed on Dec. 17, 2012, now Pat. No. 9,947,041.

(51) Int. Cl.

| | |
|---|---|
| ***G06Q 30/00*** | (2012.01) |
| ***G06F 17/30*** | (2006.01) |
| ***G06Q 30/08*** | (2012.01) |

(52) U.S. Cl.
CPC .................................... *G06Q 30/08* (2013.01)

(58) Field of Classification Search
CPC ...................................................... G06Q 30/08
See application file for complete search history.

(56) References Cited

U.S. PATENT DOCUMENTS

| | | | |
|---|---|---|---|
| 6,058,379 | A | 5/2000 | Odom |
| 6,185,599 | B1 | 2/2001 | Salimando |
| 6,502,113 | B1 | 12/2002 | Crawford |
| 6,684,196 | B1 | 1/2004 | Mini |
| 6,813,612 | B1 | 11/2004 | Rabenold |
| 7,353,183 | B1 | 4/2008 | Musso |
| 7,617,145 | B1 | 11/2009 | Peterson |
| 2002/0178069 | A1 | 11/2002 | Walker |
| 2005/0240511 | A1 | 10/2005 | Chadwick |
| 2006/0190386 | A1 | 8/2006 | Levy |
| 2007/0211876 | A1 | 9/2007 | Othmer |
| 2007/0299766 | A1 | 12/2007 | Bril |
| 2008/0071634 | A1 | 3/2008 | Rampell et al. |
| 2008/0103883 | A1 | 5/2008 | Szybalski |
| 2008/0294543 | A1 | 11/2008 | Shebby |
| 2009/0006117 | A1 | 1/2009 | Shapiro |
| 2009/0112726 | A1 | 4/2009 | Miller |
| 2012/0084169 | A1 | 4/2012 | Adair |
| 2012/0290485 | A1 | 11/2012 | Ozonat |
| 2013/0103592 | A1 | 4/2013 | Shenk |
| 2013/0218708 | A1 | 8/2013 | Finkelstein |

(Continued)

OTHER PUBLICATIONS

Rischpater, R. (2004). EBay Application Development. Apress.*

(Continued)

*Primary Examiner* — Kathleen Palavencino
(74) *Attorney, Agent, or Firm* — Mahamedi IP Law LLP

(57) ABSTRACT

Bidding activity is analyzed over a duration in which multiple bids are received in the auction. A bid increment is dynamically determined for the auction in response to auction activity. An online auction system can utilize the bid increment to determine or suggest the next bid that can be received in the auction for purpose of supplanting the current bid.

20 Claims, 6 Drawing Sheets

(56) References Cited

U.S. PATENT DOCUMENTS

| | | | |
|---|---|---|---|
| 2014/0236751 | A1 | 8/2014 | Bloomfield |
| 2014/0289065 | A1 | 9/2014 | Gladis et al. |
| 2016/0071178 | A1 | 3/2016 | Perriello |

OTHER PUBLICATIONS

International Search Report and Written Opinion dated Aug. 31, 2016, Application No. PCT/US16/33802, 9 Pages.

Rischpater, R. (2004). Ebay Application Development. Apress. 321 pages.

* cited by examiner

DYNAMICALLY DETERMINING BID INCREMENTS FOR ONLINE AUCTIONS

RELATED APPLICATION

This application is a continuation of U.S. patent application Ser. No. 13/717,656, filed Dec. 17, 2012, entitled "DYNAMICALLY DETERMINING BID INCREMENTS FOR ONLINE AUCTIONS"; the aforementioned priority application being hereby incorporated by reference in its respective entirety.

TECHNICAL FIELD

Examples described herein relate to online auctions, and more specifically, to a system and method for dynamically determining bid increments for online auctions.

BACKGROUND

Numerous online auction forums exist that enable consumers and sellers to transact for various kinds of items, such as collectibles, electronics and other goods or services.

DETAILED DESCRIPTION

Figure 1:
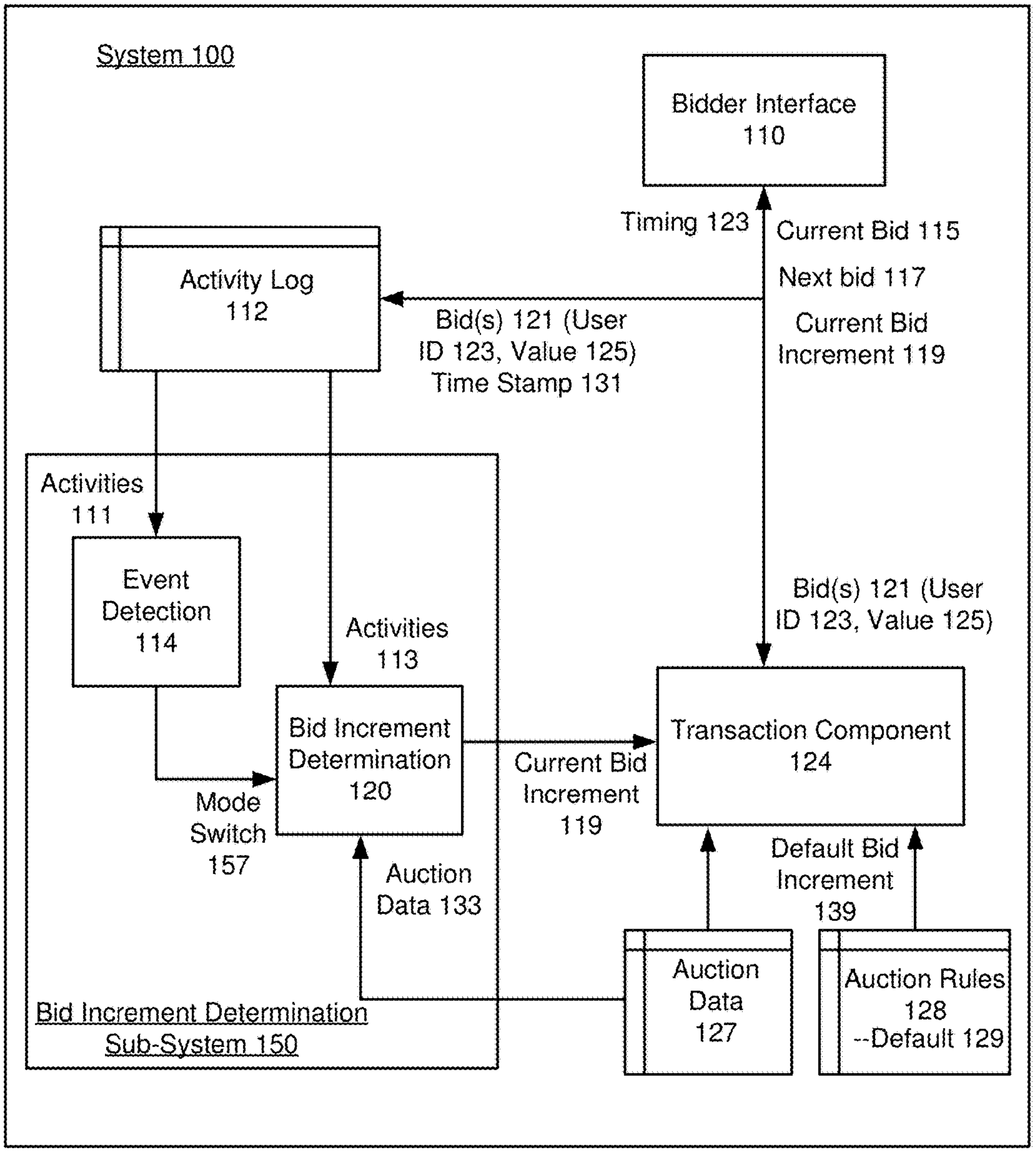
FIG. 1 illustrates an example system for implementing dynamic bid increments in an online auction.

Examples described herein provide for online auction forums that utilize dynamically determined bid increments for purpose of communicating a next bid that is to supplant a current bid. By dynamically determining the bid increment, the auction can be implemented in a manner that optimizes bidding in view of specific auction activity. Among other benefits, the dynamic bid determination can be utilized to achieve higher bids for the auctioned item in a shorter period of time.

In an online auction, bidding activity is analyzed over a duration in which multiple bids are received in the auction. A bid increment is dynamically determined for the auction in response to auction activity. An online auction system can utilize the bid increment to determine or suggest the next bid that can be received in the auction for purpose of supplanting the current bid.

According to some embodiments, an auction forum is provided for conducting an auction. The forum may include a bidder interface that enables bidding of an item (or product, property, service, etc.) being auctioned when the auction is in progress. One or more types of auction activities can be monitored during the auction. An updated bid increment is determined from monitoring the one or more types of auction activities. The bid increment may be deemed to be more optimal than a default bid increment in, for example, arriving at a maximum price or a reserve price. The updated bid increment may be communicated to the bidders of the auction for pricing the next bid.

As used herein, the term "optimal" or its variants (e.g., "optimized," "optimization") refers to an act in an outcome that is deemed to be improved based on a criterion or criteria.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Auction Architecture

FIG. 1 illustrates an example system for implementing dynamic bid increments in an online auction. A system 100 such as described by an example of FIG. 1 can be implemented in a variety of computing environments. For example, system 100 can be implemented as part of an online market environment, such as an online auction. Still further, the system 100 can be implemented as a network service that augments or facilitates an online market place. Accordingly, system 100 can be implemented as a network service, through a combination of servers or other network enabled computing devices. In variations, system 100 can be implemented on other computing platforms, including stand-alone systems. Thus, in some variations, system 100 can operate on a product or service that is maintained on a single computing device or storage device.

In an example of FIG. 1, system 100 implements an auction forum from which multiple auctions can be conducted. In one implementation, the system 100 includes a bidder interface 110, an activity log 112, and a transaction component 124. The system 100 can also include a bid increment determination sub-system 150 for pricing bids when the auction is in progress. When an online auction is initiated, persons (e.g., bidders) can interact with the bidder interface 110 to determine whether to place a bid, and to submit the bid for the item being auctioned. The transaction component 124 can implement auction rules 128 and logic for receiving bids and advancing the auction to completion. As described by various examples, the bid increment determination sub-system 150 can adjust a bid increment for the auction upwards and/or downwards based on conditions, such as determined from auction activity.

In one implementation, the bidder interface 110 can be implemented as part of a web page in which the current bid amount is displayed to a population of potential bidders. In variations, the bidder interface 110 can be implemented as part of an application page or presentation which displays information and provides functionality corresponding to the bidder interface 110. Various kinds of information and functionality can be displayed through the bidder interface 110, including the current bid 115 (the highest placed bid), as well as the bid increment 119 and/or next bid 117 (e.g., the current bid 115 in addition to the bid increment 119). Other information that can be displayed through the bidder interface 110 include timing information 123 which can include, for example, the time left for a bidder to submit a bid and/or for the time left for the auction to be over. When the auction is over, the bidder with the current bid 115 can be assumed to be the winner of the auction. Prior to the auction being over, the bid increment 119 can identify the next bid amount by which a participant can become the highest bidder. Depending on the auction rules, the bidder can place an amount that is higher than what is suggested by the bid increment 119, but not lower (unless auction rules permit otherwise). The bidder interface 110 can display various other kinds of information as well, such as information about the asset being auctioned (e.g., description, images, etc.), parameters such as whether a reserve price has been placed and/or whether the reserve price has been met, information about the seller, or a full or partial bid history (e.g., the bidder or bidder identity and a corresponding bid amount, the number of bids received in a given duration etc.).

The transaction component 124 can conduct the auction in accordance with the auction rules 128, which can include, among other logic, default rules 129. The default rules 129 can provide values for the initial bid and/or the default bid increment 139. The auction rules 128 can also control implementation of various facets of how the auction is conducted, such as for example, the type of auction being conducted (e.g., English auction), and the timing aspects of the auction (e.g., when bids can be received, when the auction is over, etc.). For example, the auction rules 128 can include timing rules which can determine the duration of time until completion of the auction, and/or the time for which a bidder can submit a bid. As an example, auction rules 128 can include timing logic which extends the completion time of the auction if a bid is submitted within a given duration from the time when the auction is completed.

With reference to the example of FIG. 1, the transaction component 124 can also maintain or access information for one or more auctions at any one time. An auction data store 127, for example, can maintain information about live or ongoing auctions. In some cases, the duration in which the auction is active can be adjusted (e.g., extended or reduced) based on auction rules 128. For example, a given auction can be conducted so that if a bid is received in a set number of minutes before the auction expiration, the auction is extended by another duration of time (e.g., one minute extension).

In one implementation, for a given auction, the bidder interface 110 enables the bidders to view the current bid 115, the next bid 117 and the bid increment 119. Multiple bidders can participate in the given auction. An auction activity log 112 can record auction activity for individual auctions. In particular, the recorded auction activity can include a history of each bid 121 that is received in the particular auction. Each bid 121 can include or be associated with a bidder identifier 123 (e.g., user name) and value 125, and the most recent bid can also correspond to the current bid 115. The activity log 112 may also record a time stamp 131 for when each bid is received. In this way, the activity log 112 can be used to identify information such as (i) number of bidders, (ii) number of bids, and/or (iii) information relating to a timing of when bids are received. As described with other examples, the timing information can be used to determine a bid velocity.

Bid Increment Determination Sub-System

According to some embodiments, the system 100 includes programmatic components to dynamically alter the bid increment in response to certain events and auction activities. In one embodiment, system 100 can operate in a default mode in which the bid increment is predetermined and based on a default value, but can be switched to a dynamic mode in which the bid increment is determined based on the determination of certain events relating to activities for the particular auction. Thus, system 100 can be multimodal, and a dynamic mode can be selected as a mechanism to achieve optimal pricing as the auction progresses towards its completion. In this regard, a technical effect is achieved in that system 100 is able to programmatically recognize when bid optimization is warranted, then dynamically determining bid increments for the auction that is likely more optimal. For example, the dynamic bid increments can achieve an outcome that is likely a higher transaction price (e.g., the value of the winning bid), or a more interested set of bidders at the end of an auction. In the context of an auction which uses time extensions when bids are received (e.g., see FIG. 2B), dynamic bid adjustment can also achieve a more optimal duration for the auction, in that the auction can be pushed to a higher transaction price in a shorter amount of time (thereby maintaining the interest of bidders).

Moreover, embodiments recognize that the bidding activity of an auction can be affected by bidding momentum. More specifically, bidding momentum (e.g., bidding activity or number of bids received) can generate higher transaction prices. By way of example, when bidding slows or ceases for auction, a reduction in bid increment can be used to generate subsequent bids, thus generating bidding momentum. With the generation of bidding momentum, additional bids can be obtained, with the possibility that an even greater bid increment can be determined and then implemented in order to achieve a higher transaction price (and optionally in an optimal duration of time). As a result, a transaction price can be achieved through programmatic bid determination when little or no bidding activity would otherwise have been present for auction.

With reference to system 100, the transaction component 124 can incorporate, or be used with, a bid increment determination sub-system 150. In one embodiment, the bid increment determination sub-system 150 includes an event detection 114, and a bid increment determination 120. The event detection 114 can optionally operate to monitor the activity log 112 for activities 111. The event detection 114 can be programmed to detect an event or condition in which the bid increment determination sub-system 150 is to switch into dynamic mode for bid increment determination. By way of example, event detection 114 can monitor for auction activities, events and conditions corresponding to one or more of (i) a threshold number of bidders, (ii) a threshold number of bids, (iii) a timing event, such as the average time between periods being reduced to a certain threshold (indicating a high degree of interest for the auction by multiple bidders), (iv) a timing event relating to the default end of the auction, such as five minutes before the auction is to close (unless, for example, the auction ending point is to be extended). Furthermore, multiple conditions may trigger the condition by which the event detection 114 signals, for example, the bid increment determination sub-system 150 to switch modes for purpose of bid increment determination.

In an embodiment, the bid increment determination 120 operates to alter the bid increment in response to auction activities 113. In one implementation, the bid increment determination 120 can respond to a mode switch signal 157 generated from the event detection 114. The bid increment determination 120 can operate to determine an optimal bid increment based on the monitored auction activities 113. The activities 113 can include, for example, (i) a number of bids received for the auction from the beginning of the auction start time, (ii) a number of bids received in a given duration of time when the auction is ongoing, (iii) a number of bidders, (iv) a determined bidding velocity, corresponding to the number of bids received for an auction in a given amount of time, and/or (v) a duration remaining in the auction (e.g., two minutes, by default, etc.). The bid increment may be deemed optimal in that it is determined to adjust the price so that the auctioned item achieves a maximum or reserve price, or alternatively arrives at a maximum or reserve range more quickly than static bid increments.

Figure 2A:
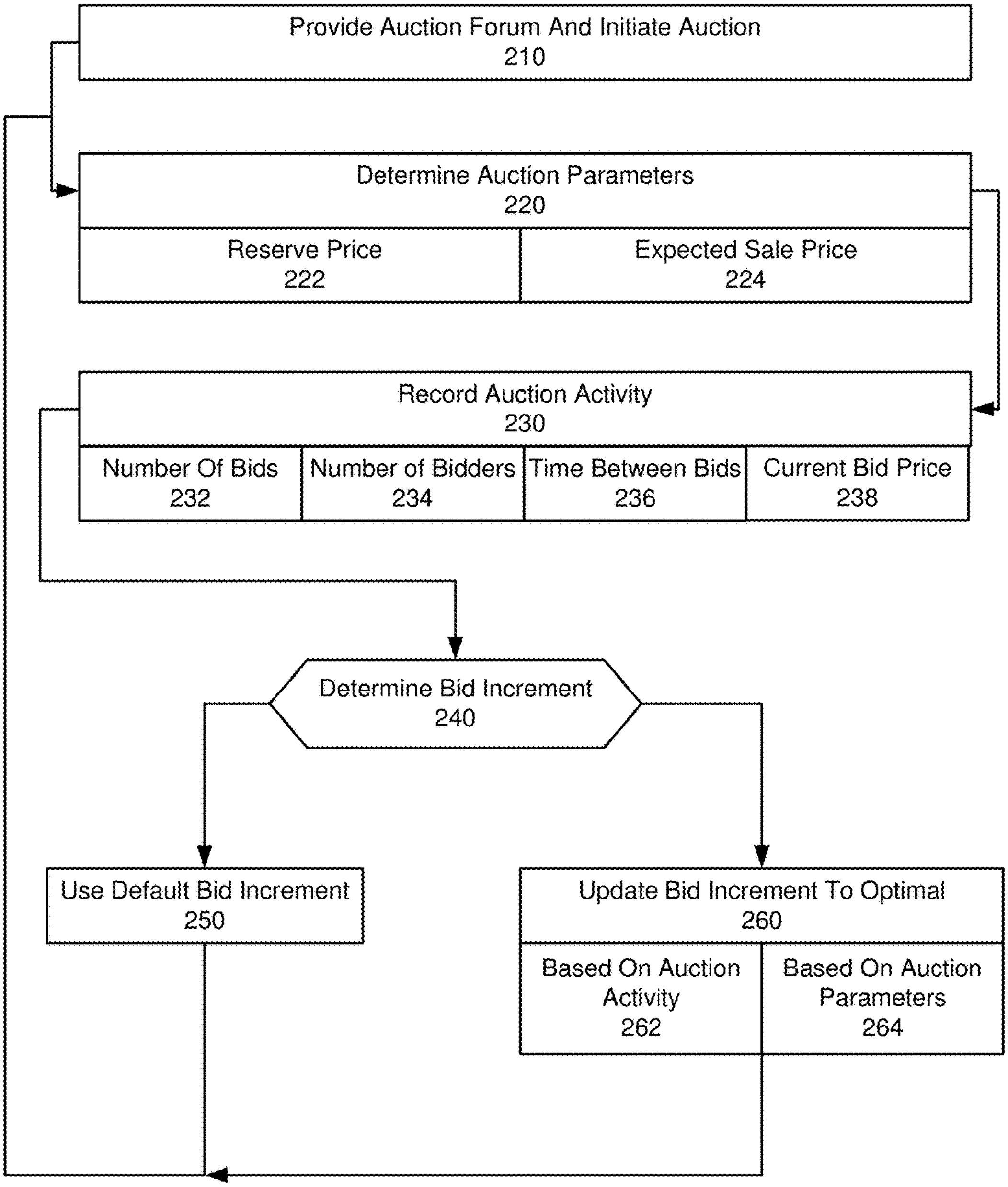
FIG. 2A illustrates an example method for conducting an online auction in a manner that utilizes dynamic bid increment determination.

In addition to using activities 113, the bid increment determination 120 can use auction data 133. The auction data 133 can include, for example, the reserve price, the estimate value of the item being auctioned, the type of property being sold in the auction, as well as the time left in the auction and/or other parameters, such as whether time extensions for the auction or in force. FIG. 2A, as described below, illustrates an example method that can be implemented in part by the bid increment determination sub-system 150 in determining the current bid increment 119.

Figure 2B:
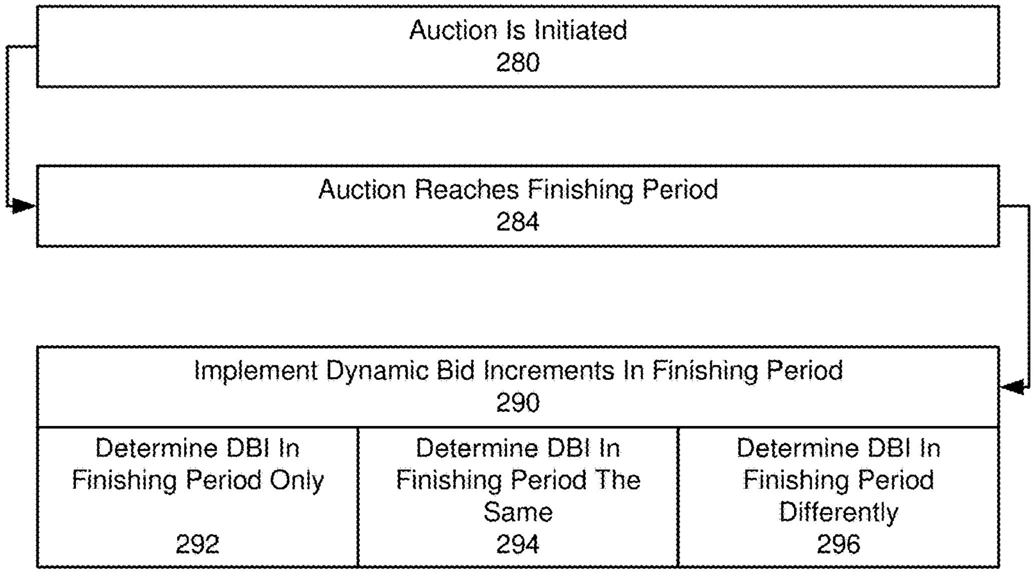
FIG. 2B illustrates an implementation of dynamic bid increments in connection with auctions that provide for time extensions in response to designated events.

Additionally, FIG. 2B illustrates an example method that can be implemented in part by the bid increment determination sub-system 150 for auctions that are extendable. In the context of extendable auctions, embodiments recognize that the use of dynamic bid incrementation can yield a technical effect of an online auction that ends quicker, so as to maintain greater user interest and bidding activity.

Each of the event detection 114 and the bid increment determination 120 can be configured to monitor for activities based on implementation and design parameters for system 100. For example, as an alternative or variation, the activities 111 (as used by event detection 114) and 113 (as used by bid increment determination 120) can be configured to utilize and respond to other kinds of activities, such as number of page views (e.g., shown amount of interest by potential bidders), bidding activity of similar products in other auctions, a type of product being auctioned (e.g., real property asset versus electable), or a subtype of product being auctioned (e.g., condominium versus commercial property).

Still further, the bid increment determination 120 may operate to dynamically determine the bid increment for each auction without a default or mode switch. For example, in one variation, the bid increment used for each auction can be determined after each bid. In another variation, the bid increment determination 120 can determine an optimal bid increment after individual bids, and then compare the default bid increment to the optimal bid increment. If the determination is that the difference between the optimal bid increment and the default bid increment exceeds some threshold, then the optimal bid increment to be used. Still further, in a variation, the optimal bid increment can be used whenever its determination indicates a significant variation from a default bid increment.

As output, the bid increment determination 120 can signal the current bid increment 119 to the transaction component 124. The current bid increment 119 can be the default bid increment (e.g., if no switch into the dynamic mode is made by bid increment determination sub-system 150 or if the default bid increment is determined to be the optimal bid increment), or an optimal or dynamic bid increment as determined from auction activities 113 and/or auction data 133.

Methodology

FIG. 2A illustrates an example method for conducting an online auction in a manner that utilizes dynamic bid increment determination. A method such as described by FIG. 2A can be implemented using, for example, a system 100 such as described by FIG. 1. Accordingly, reference may be made to elements of FIG. 1 for purpose of illustrating suitable components for performing a step or sub step being described.

In FIG. 2A, an auction forum is provided, and an auction is initiated (210). In one implementation, an online auction provider can trigger the start of an auction for a particular item at a given point in time. The length of the auction can be determined by various parameters, such as a default or set time from when the auction is initiated (e.g., number of days). Optionally, in some implementations, the length of the auction can be varied or algorithmically determined from the time the auction is initiated. For example, in one implementation, an auction can be extended when a bid is received in a final predetermined duration of time before the auction is to end.

Once the auction is started, a determination can be made to determine or identify a designated set of auction parameters (220). For a given auction, the auction parameters can include, for example, the reserve price (222), or an expected sale price (224) (or alternatively the value of the item being auctioned). Other parameters of the auction can include, for example, the number of people who view the auction page, the title property being sold, the expected duration of the auction, and/or the preference settings of the seller.

Additionally, once the auction is initiated, certain types of auction activity can be monitored and recorded (230). In one implementation, the type of auction activity that can be recorded can include those which are subsequently used to determine optimal or alternative bid increments based on ongoing auction activity and/or other parameters. For example, event detection 114 and/or bid increment determination 120 can operate to determine auction activity that corresponds to one or more of the following: (i) the number of bids received for the auction since it was initiated (232), (ii) the number of bidders that are participating (e.g., who have placed bids) in the auction (234), (iii) the time between recent or most recent bids (e.g., average time between the five most recent bids) (236), and/or the current bid price (238).

In some embodiments, a programmatic determination is made for selecting how to determine the bid increment (240) when the auction is ongoing. In one implementation, the determination can be made as to whether system 100 should (i) use a mode in which a default bid increment is applied to a current bid in order to determine a next bid, or (ii) use a dynamic mode in which the bid increment is determined based on activities and parameters of the auction. In one implementation, the bid increment can be maintained at a default value, or in accordance with a predetermined formula until a condition is met for switching the mode to a dynamic mode determination. Thus, in one implementation, a determination can be made as to whether a predetermined condition is present for switching the mode for determining the bid increment. The condition can be determined from predetermined auction activity, such as number of bidders, the number of bids, the number of bids or bidders in a given period of time, the amount of time remaining in the auction, or combination thereof. If the condition is not present, the default bid increment can be maintained until at least when the determination is made again (e.g., the next bid).

If the condition is not present, the default bid increment may be used (250). In one implementation, the default bid increment is a static value that is applied to the auction. The static value can be based on, for example, the reserve price, the expected value of the item being auctioned, or prior auctions. In variations, the default bid increment can be determined by formula, independent of the ongoing auction activity or parameters. For example, the default bid increment can decrease as a function of time as the auction nears its end.

If a determination is made that the condition is present, then the bid increment can be changed dynamically (260). More specifically, in some embodiments, an updated bid increment is determined that is deemed optimal based on one more criteria (e.g., number of bids or bidders, bid velocity, etc.) (262). As an alternative or addition, the updated bid increment can be determined from auction parameters, such as the reserve price, or the expected value of the item being auctioned (264).

FIG. 2B illustrates implementation of dynamic bid increments in connection with auctions that provide for time extensions in response to designated events. While many auctions end after a designated interval, some auctions operate under rules in which the auction is automatically extended when specific bidding activity or events occur. In such auctions, the use of dynamic bid increments can optimize the auction by enabling the transaction price to reach a higher value more quickly, while at the same time shortening the duration of the auction.

A method such as described by FIG. 2B can be implemented using, for example, a system 100 such as described by FIG. 1. Accordingly, reference may be made to elements of FIG. 1 for purpose of illustrating suitable components for performing a step or sub step being described.

With reference to FIG. 2B, an auction may be initiated at an auction forum, under rules where the auction is extended from the default finish time when a bid is received. Thus, the auction may be initiated (280) so that auction activity occurs (e.g., bids are received). Prior to the finishing period, dynamic bid increments can optionally be determined and utilized. For example, the bid increment determination sub-system 150 can be used to alter (lower or higher) a default bid increment in view of auction activity, and further in response to the occurrence of pre-selected events or conditions.

After a duration, the auction may reach a finishing period when extension rules are applicable (284). For example, the rules may provide that the transaction component 124 extends the auction if a bid is received in the last portion of time before the auction being finished (e.g., last ten seconds, last minute or last five minutes, etc.). Alternatively, factors such as whether the reserve price is met can weigh whether and how the auction is extended.

According to some embodiments, dynamic bid increments can be utilized in the finishing period (290). In one implementation, the auction is conducted so that dynamic bid increments are determined in the finishing period, but not prior to the finishing period (292). Another implementation provides that if dynamic bid increments are utilized prior to the finishing period, then the same (or substantially similar) bid increment algorithm is employed in the finishing period (294).

In a variation, the dynamic bid increments utilized in the finishing period may be determined under a substantially different algorithm than the bid increment determination that occurs prior to the finishing period (296). Thus, the events that are used to determine when dynamic bid increments are determined can differ from those events and activities used for determining bid increments prior to the finishing period. Likewise, the auction activities that are used to in the determination of the dynamic bid increments can differ from the activities used in determining the bid increments prior to the finishing period. For example, prior to the finishing period, the bid increment determination sub-system 150 may determine the dynamic bid increment in response to certain conditions or events (e.g., number of bids or bidders). But once the finishing period is initiated, the bid increment determination sub-system 150 may determine the dynamic bid increments automatically, and/or in response to each bid. Furthermore, the bid increment determination sub-system 150 may determine the bid increments using activities and parameters that include bid velocity, number of bids and/or time.

EXAMPLES

Figure 3:
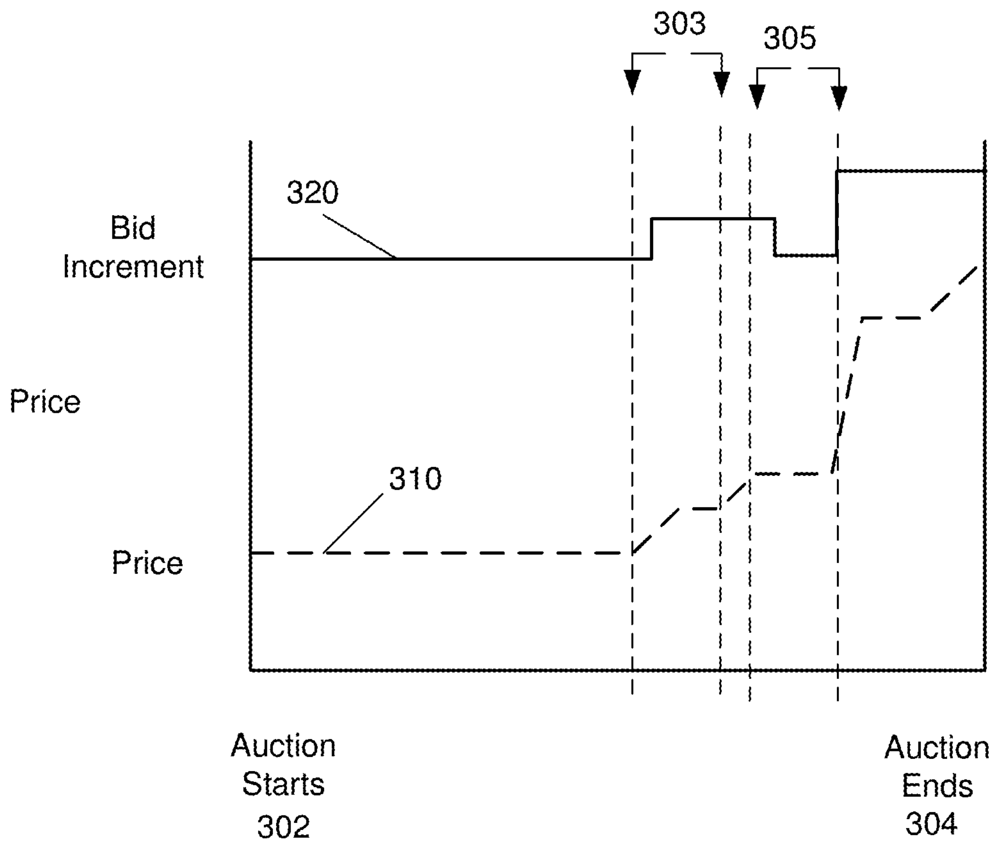
FIG. 3 illustrates a dynamic bid increment example for an online auction in graphic form.

FIG. 3 illustrates a dynamic bid increment example for an online auction in graphic form. The dynamic bid increment example illustrated by FIG. 3 can be implemented using embodiments such as described with FIG. 1, FIG. 2A and/or FIG. 2B. With reference to FIG. 3, an auction price line 310 is intended to illustrate a given price pattern for an auctioned item (e.g., real property, automobile, collectible, etc.). The auction price line 310 reflects an increase in the auction price over a time period that extends between the auction start 302 and the auction end 304. For example, at the beginning of the auction, no bidding activity may occur. As the auction nears its end, bidding activity may initiate, and then increase until the point where the auction ends.

The bid increment line 320 illustrates an example of dynamic bid increment determination to reflect bidding activity. The bidding activity can correspond to, for example, the number of bids received, the number of bidders, and/or the bidding velocity (as measured by a variety of timing parameters, such as the time between bids). The value of the bid increment can be determined algorithmically to leverage bidding momentum (the number of bids received in a recent time period as compared to a prior time period). In one implementation, the bid increment is made higher with increased bidding momentum. This enables the bid increment to be optimized in that a higher price is achieved in less time. For example, in time period 303, the bidding activity may be deemed to merit an increase in the bid increment.

Additionally, some embodiments recognize that when bidding activity slows (e.g., the number of bids in a recent time period is less than number of bids in prior time period), reducing the bid increment can serve as a mechanism to regain bidding momentum. This reduction in the bid increment is illustrated in time period 305. The bid increment can be reduced from an increased amount to the default amount (or less than the default amount) as a result of non-existent or decreased bidding activity (as shown by the price line 310 remaining at a same value). For example, the bid reduction can step the bid increment down to the default value to garner more bids, but if additional bids are not submitted, then the bid increment can be reduced even further. By way of example, in real property auction, the bid increment can be adjusted from $5000 to $10000 when bidding activity occurs, then reduced to $5000 and then again to $1000 until the auction is over or until bidding activity resumes.

In the example shown, the bidding momentum is regained once the bid increment is reduced. In an embodiment, the bid increment can be increased to reflect the gain in bidding momentum. By adjusting the bid increment upward and downward, examples such as described enable an auction to be completed with optimal bid increments that serve to push the auction to a higher price and more quickly.

Figure 4:
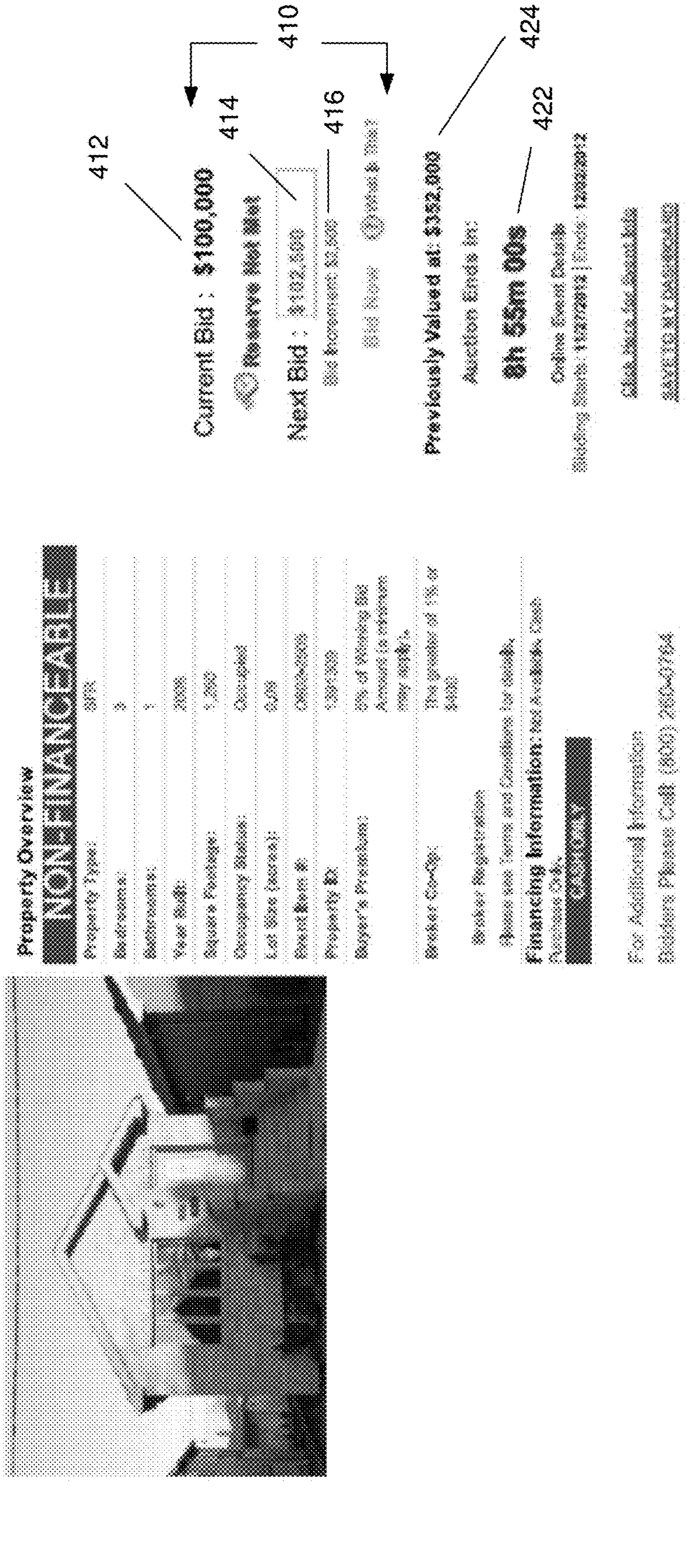
FIG. 4 illustrates an implementation of an online auction in accordance with examples such as described.

FIG. 4 illustrates an implementation of an online auction in accordance with examples such as described. In FIG. 4, a bidder interface 410 is provided by way of a functional web page. In variations, the bidder interface can be implemented by, for example, an application page (e.g., rendering from a mobile application). In the example of FIG. 4, the bidder interface 410 includes a current bid 412, a next bid amount 414 and a bid increment 416. As described with various examples, the bid increment 416 can be adjusted upward or downward in response to the occurrence of auction activities, or the absence of auction activities. For example, additional bidding activity may cause the bid increment to raise from $2500 to $5000 (so that the next bid is $105,000), and an absence of bidding activity can decrease the bid increment from $2500 to $1000 (so that the next bid is $101,000).

In some implementations, the factors that can affect the bid increment include the number of bids received, the number of bidders, and the bidding velocity. Additional or alternative factors can include the timing of the auction (e.g., the time 422 reflecting when the auction will or may end). For example, as the auction nears its end, the reduced time remaining can influence or weight the bid increment towards a higher amount. Another factor that can weight or determine the increased bid amount is the value associated with the auctioned item. The value can reflect the reserve amount (which can be hidden), or the estimated value of the auctioned item 424 (e.g., previously auctioned item).

Still further, in one implementation, dynamic bid increments can be determined in a time period before a reserve price being met. In another implementation, dynamic bid increment can be determined in a time period after a reserve price is met.

Computer System

Figure 5:
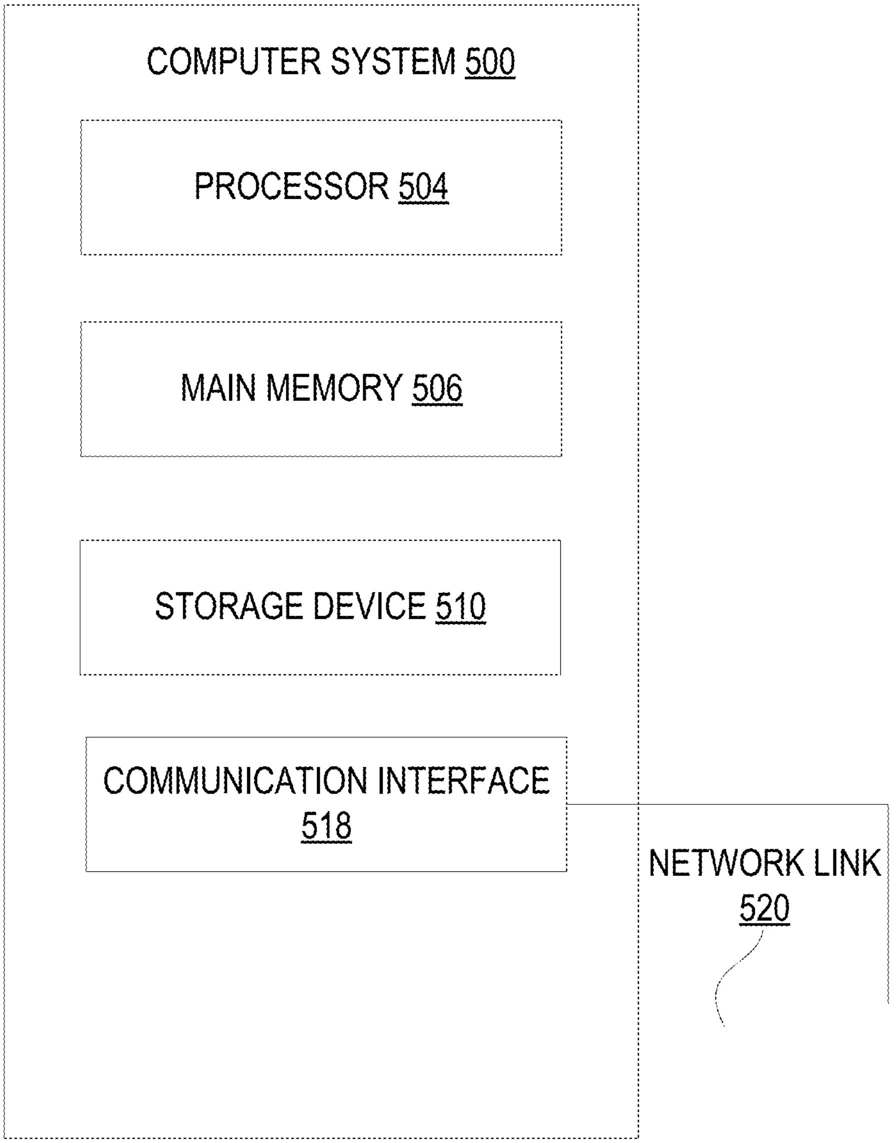
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, system 100 may be implemented using one or more servers such as described by FIG. 5.

In an embodiment, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 (wireless or wireline). The communication interface 518 may communicate with bidders and auction participants using, for example, the Internet.

Embodiments described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A network system for presenting a dynamic auction webpage for an online auction comprising:

one or more processors; and one or more memory resources storing instructions that, when executed by the one or more processors of the network system, cause the network system to:

communicate over a network with a user device to cause the user device to present a dynamic auction webpage that includes a bidder interface that enables a user of the user device to submit a bid on an asset associated with the dynamic auction webpage, wherein the bidder interface displays bidding parameters associated with a subsequent bid to be submitted via the bidding interface, including a current bid, a next bid, and a bid increment;

in response to detecting a predetermined condition, dynamically update the bidder interface by:

while the online auction is being conducted, determining an indicator of interest in the online auction based at least in part on activity data associated with the online auction, including a page view count maintained by the network system for the dynamic auction webpage; and dynamically updating the bidder interface displayed on the dynamic auction webpage to reflect updated bidding parameters, including an updated bid increment that is determined based on the indicator of interest.

2. The network system of claim 1, wherein the executed instructions further cause the network system to: (i) progress the online auction in accordance with a set of auction rules, and (ii) determine the updated bid increment based further on the set of auction rules.

3. The network system of claim 1, wherein the predetermined condition is based on a determination of a set of auction activities.

4. The network system of claim 1, wherein the predetermined condition corresponds to a determination that a designated duration of time has passed from when the online auction was initiated.

5. The network system of claim 1, wherein the indicator of interest is determined each time a bid is received for the online auction.

6. The network system of claim 1, wherein determining the indicator of interest is based further on a number of bids that are received in a given duration.

7. The network system of claim 1, wherein the updated bid increment is further determined based on a bid velocity of bids received over a given duration.

8. The network system of claim 1, wherein the updated bid increment is determined based further on a reserve price or desired price for the asset associated with the online auction.

9. The network system of claim 1, wherein the updated bid increment is further determined based on a type of asset associated with the online auction.

10. The network system of claim 1, wherein communicating over a network with the user device includes communicating with the user device that to cause the user device to render the dynamic auction webpage within an application executing on the user device.

11. A method for presenting a dynamic auction webpage for an online auction, the method being performed by a network system and comprising:

communicating over a network with a user device to cause the user device to present a dynamic auction webpage that includes a bidder interface that enables a user of the user device to submit a bid on an asset associated with the dynamic auction webpage, wherein the bidder interface displays bidding parameters associated with a subsequent bid to be submitted via the bidding interface, including a current bid, a next bid, and a bid increment;

in response to detecting a predetermined condition, dynamically determining the bidding parameters by:

while the online auction is being conducted, determining an indicator of interest in the online auction based at least in part on activity data associated with the online auction, including a page view count maintained by the network system for the dynamic auction webpage; and dynamically updating the bidder interface displayed on the dynamic auction webpage to reflect updated bidding parameters, including an updated bid increment that is determined based on the indicator of interest.

12. The method of claim 11, further comprising:

progressing the online auction in accordance with a set of auction rules; and determining the updated bid increment based further on the set of auction rules.

13. The method of claim 11, wherein the predetermined condition is based on a determination of a set of auction activities.

14. The method of claim 11, wherein the predetermined condition corresponds to a determination that a designated duration of time has passed from when the online auction was initiated.

15. The method of claim 11, wherein the indicator of interest is determined each time a bid is received for the online auction.

16. The method of claim 11, wherein determining the indicator of interest is based further on a number of bids that are received in a given duration.

17. The method of claim 11, wherein the updated bid increment is further determined based on a bid velocity of bids received over a given duration.

18. The method of claim 11, wherein the updated bid increment is determined based further on a reserve price or desired price for the asset associated with the online auction or a type of asset associated with the online auction.

19. The method of claim 11, wherein communicating over a network with the user device includes communicating with the user device that to cause the user device to render the dynamic auction webpage within an application executing on the user device.

20. A non-transitory computer-readable medium storing instructions that, when executed by one or more processors of a network system, cause the network system to:

communicate over a network with a user device to cause the user device to present a dynamic auction webpage for an online auction that includes a bidder interface that enables a user of the user device to submit a bid on an asset associated with the dynamic auction webpage, wherein the bidder interface displays bidding parameters associated with a subsequent bid to be submitted via the bidding interface, including a current bid, a next bid, and a bid increment;

in response to detecting a predetermined condition, dynamically update the bidder interface by:

while the online auction is being conducted, determining an indicator of interest in the online auction based at least in part on activity data associated with the online auction, including a page view count maintained by the network system for the dynamic auction webpage; and dynamically updating the bidder interface displayed on the dynamic auction webpage to reflect updated bidding parameters, including an updated bid increment that is determined based on the indicator of interest.

* * * * *